(12) United States Patent
Wilson et al.

(10) Patent No.: US 8,201,777 B2
(45) Date of Patent: Jun. 19, 2012

(54) AIRCRAFT DOOR AND METHOD FOR USING THE SAME

(75) Inventors: Raymond Wilson, Athens, AL (US); Steven Paul Walker, Arlington, WA (US); Andrew Bourne, Bothell, WA (US)

(73) Assignee: B/E Aerospace, Inc., Wellington, FL (US)

( * ) Notice: Subject to any disclaimer, the term of this patent is extended or adjusted under 35 U.S.C. 154(b) by 993 days.

(21) Appl. No.: 12/181,496

(22) Filed: Jul. 29, 2008

(65) Prior Publication Data
US 2010/0001136 A1    Jan. 7, 2010

Related U.S. Application Data

(60) Provisional application No. 60/953,148, filed on Jul. 31, 2007.

(51) Int. Cl.
*B64C 1/14* (2006.01)
*E05B 3/00* (2006.01)

(52) U.S. Cl. .................. 244/129.5; 292/336.3

(58) Field of Classification Search ............... 244/129.1, 244/129.4, 129.5; 49/394; 292/39, 51, 112, 292/199, 201, 280, 336.3
See application file for complete search history.

(56) References Cited

U.S. PATENT DOCUMENTS

| | | | |
|---|---|---|---|
| 3,791,073 A | 2/1974 | Baker | |
| 4,944,473 A | 7/1990 | Kallies et al. | |
| 5,031,863 A * | 7/1991 | Noble | 244/129.5 |
| 5,064,147 A | 11/1991 | Noble et al. | |
| 5,156,359 A | 10/1992 | Noble et al. | |
| 5,251,851 A * | 10/1993 | Herrmann et al. | 244/129.5 |
| 5,337,977 A | 8/1994 | Fleming et al. | |
| 5,931,415 A * | 8/1999 | Lingard et al. | 244/129.5 |
| 6,457,674 B2 * | 10/2002 | Erben et al. | 244/129.5 |
| 6,467,729 B2 * | 10/2002 | Buchs et al. | 244/129.5 |
| 6,547,185 B2 * | 4/2003 | Erben et al. | 244/129.5 |
| 7,207,524 B2 * | 4/2007 | Puschmann et al. | 244/129.5 |
| 2002/0014557 A1 * | 2/2002 | Erben et al. | 244/129.5 |
| 2003/0122036 A1 | 7/2003 | Artsiely | |

\* cited by examiner

*Primary Examiner* — Tien Dinh
*Assistant Examiner* — Joseph W Sanderson
(74) *Attorney, Agent, or Firm* — Drinker Biddle & Reath LLP

(57) ABSTRACT

An external door for use in accessing a cargo area of an aircraft fuselage. The door includes a locking system, a latching system, a lock monitoring system, an uplock used to secure the door in an open position, and an actuating system that assists in at least one of opening and closing the door. The locking system works by interfering with the movement of the latching system components. The locking system includes a monitoring device that prevents the aircraft from being pressurized in case of a malfunction in the locking system. The latching system includes a handle locking system that prevents operation of the latch handle by accident or by ground loading or flight forces. The systems of the door are preferably manually operated, and utilize rigid members.

16 Claims, 20 Drawing Sheets

AIRCRAFT DOOR AND METHOD FOR USING THE SAME

CROSS-REFERENCE TO RELATED PATENT APPLICATIONS

This application claims priority to U.S. provisional patent application 60/953,148, filed Jul. 31, 2007, which is incorporated in its entirety herein by reference.

FIELD OF THE INVENTION

The present invention relates generally to aircraft external doors, and more particularly to latching and locking mechanisms for such doors.

BACKGROUND OF THE INVENTION

Many aircraft include an external door for accessing an aircraft cargo area. Cargo areas typically utilize upward-opening, canopy-style doors, as opposed to the side-opening, plug-style doors used for passenger ingress and egress. Many forms of doors exist for cargo loading and unloading; however, these designs suffer from a number of weaknesses, including susceptibility to malfunction caused by icing of door components, leading to the possibility that an aircraft may take off with a door improperly secured. Previous designs have used cable-actuated monitoring systems to indicate successful door closure; however, these designs are subject to malfunction due to icing. The difficulty in creating a hermetic seal between the actuating cable and the cable housing leads to formation of ice inside the cable housing, rendering the cable inoperative. Additionally, prior designs have utilized latching systems that require a dwell in the latching actuation. This introduces additional cost and complexity into the design. Because these latching systems are independent of the locking systems, additional parts and interface requirements are needed. Furthermore, existing designs do not provide an independent lock for the latch system, leading to the possibility that ground loads or in-flight forces could create a torque on the system and possibly unlatch the door in the event of a failure in the lock system.

A need, therefore, exists for an integrated latching/locking system that minimizes parts count and complexity, while eliminating the reliability issues caused by icing or other adverse conditions.

BRIEF DESCRIPTION OF THE DRAWINGS

Exemplary embodiments of the invention described herein are shown in the attached drawings. It is understood, however, that the invention is not limited to the precise arrangements and constructions particularly shown. In the drawings.

DETAILED DESCRIPTION OF THE EMBODIMENTS

Figure 1:
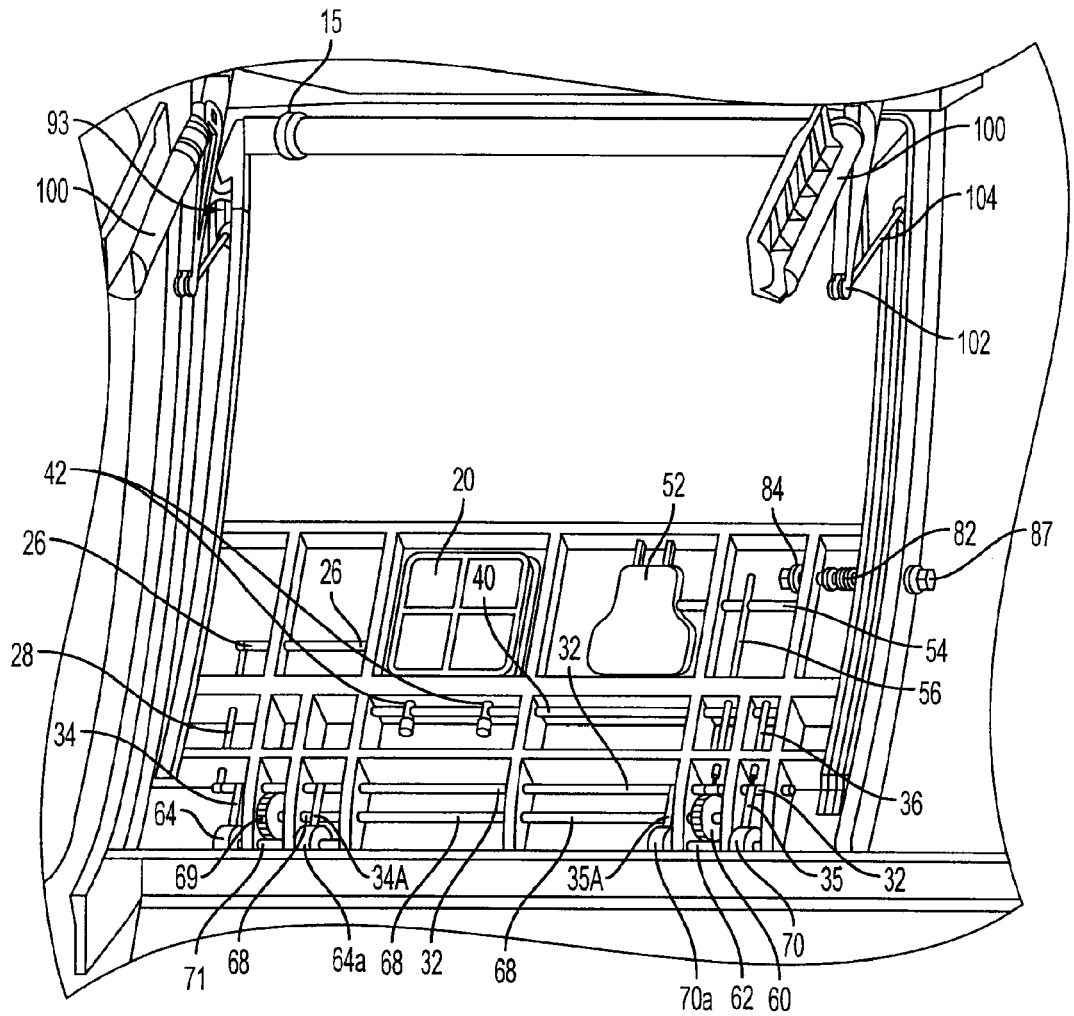
FIG. 1 is a plan view of the inside of the aircraft door employing an embodiment of the present invention.

The exemplary embodiments of the invention described herein relate to an aircraft door. The door in these embodiment is used to access the cargo area of the aircraft from the exterior of the craft. The door includes a locking system, a latching system featuring an integrated lock, an actuating system, and safety features, including a lock monitoring system, a latch handle interlock, and an uplock system to secure the door in an open position.

The locking system in this example is actuated by a vent door, and both immobilizes the door's latching system and ensures that the aircraft cannot be pressurized for flight unless the vent door is properly closed. The system includes a monitoring system that prevents closure of the vent door, and thus pressurization of the aircraft, if there is a malfunction in the locking system. The locking system prevents movement of the components of the latching system. The latching system, like the lock system and monitoring system, relies on, for example, rigid components or members to transfer force and motion through the system. The latching system uses locking cams that engage latch pins mounted to the fuselage of the aircraft. Additionally, the latching system in this example cannot be moved into the latched position unless the door is in proper position to be latched. Furthermore, the latching system further incorporates its own lock system, which prevents forces from ground or flight loads from applying a torque to the latching system and potentially opening the door. When the door is extended into a fully open position, an uplock system secures it in place until the uplock is released.

Referring now to the drawings which illustrate several preferred embodiments of the invention, a latching/locking system is shown for an aircraft cargo door.

Figure 11A:
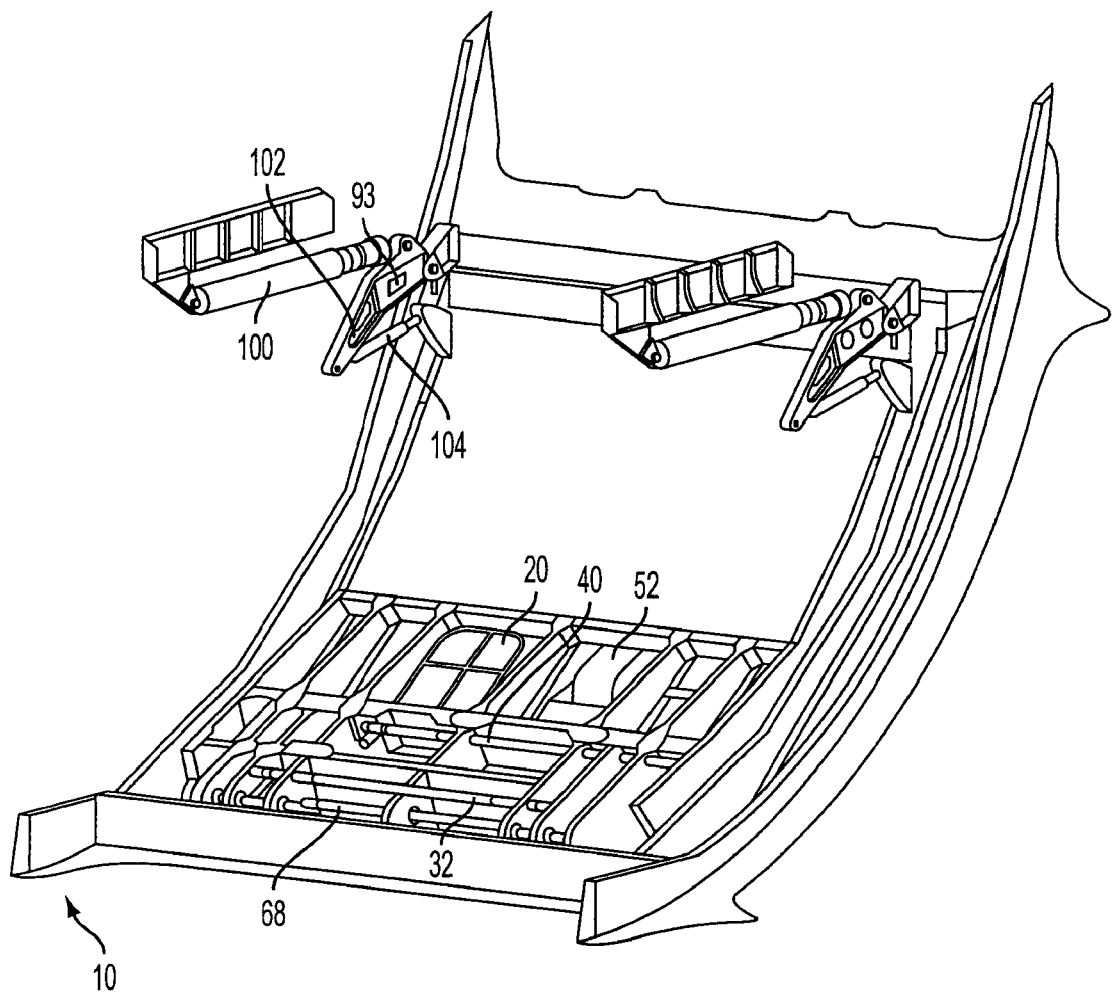
FIG. 11A is an isometric view of the door of FIG. 1 in a closed position.
Figure 11B:
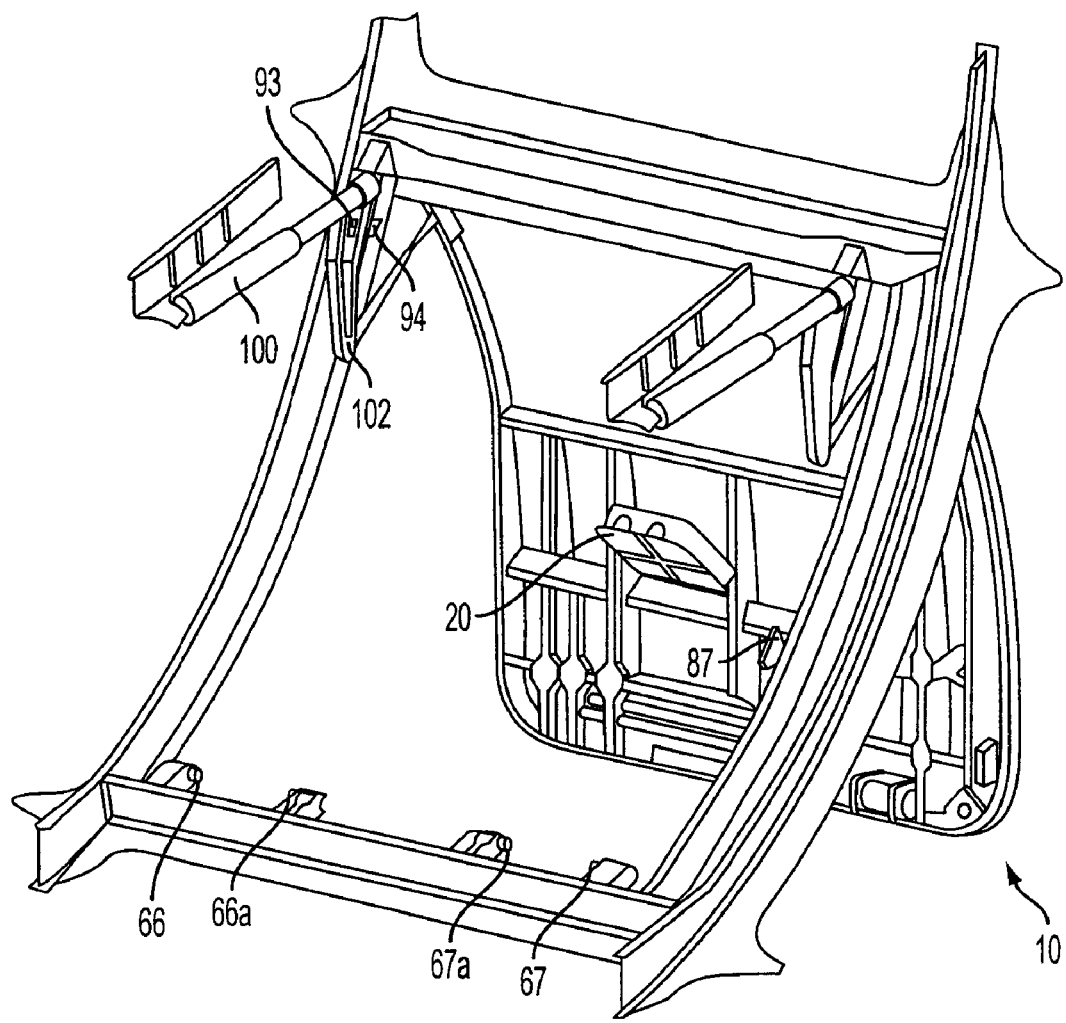
FIG. 11B is an isometric view of the door of FIG. 1 in a partially-open position.
Figure 11C:
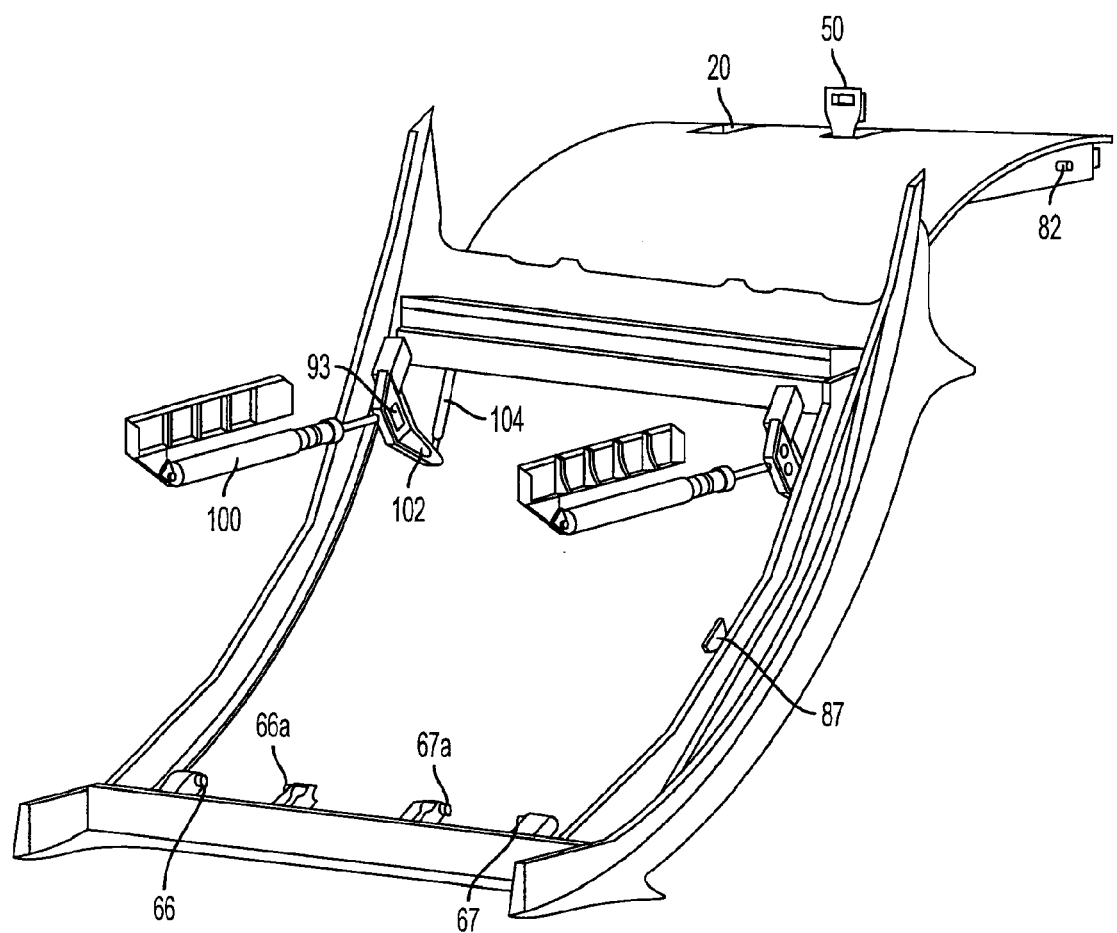
FIG. 11C is an isometric view of the door of FIG. 1 in a fully-open position.
Figure 12A:
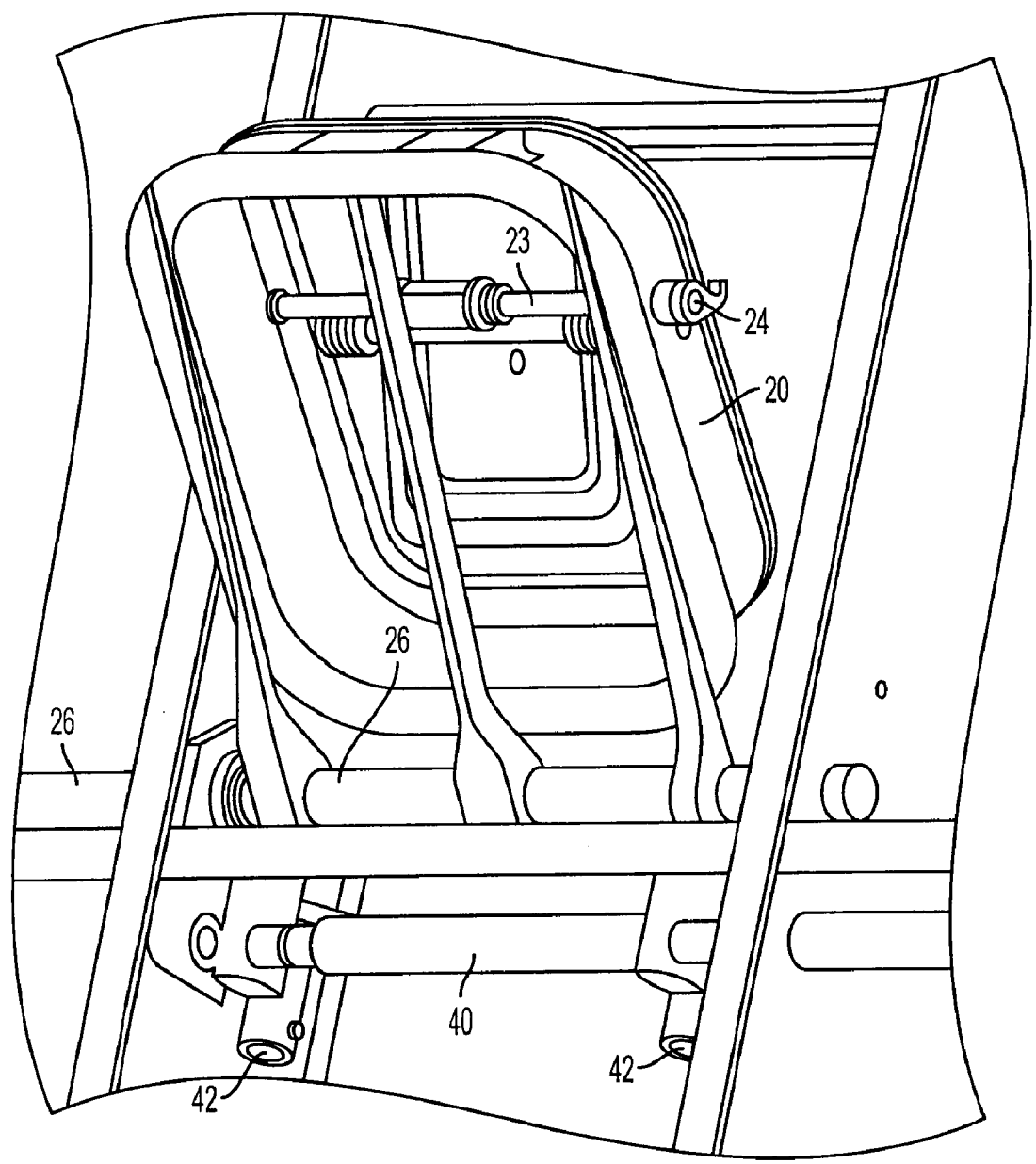
FIG. 12A is an isometric view of the monitoring system of FIG. 4.
Figure 12B:
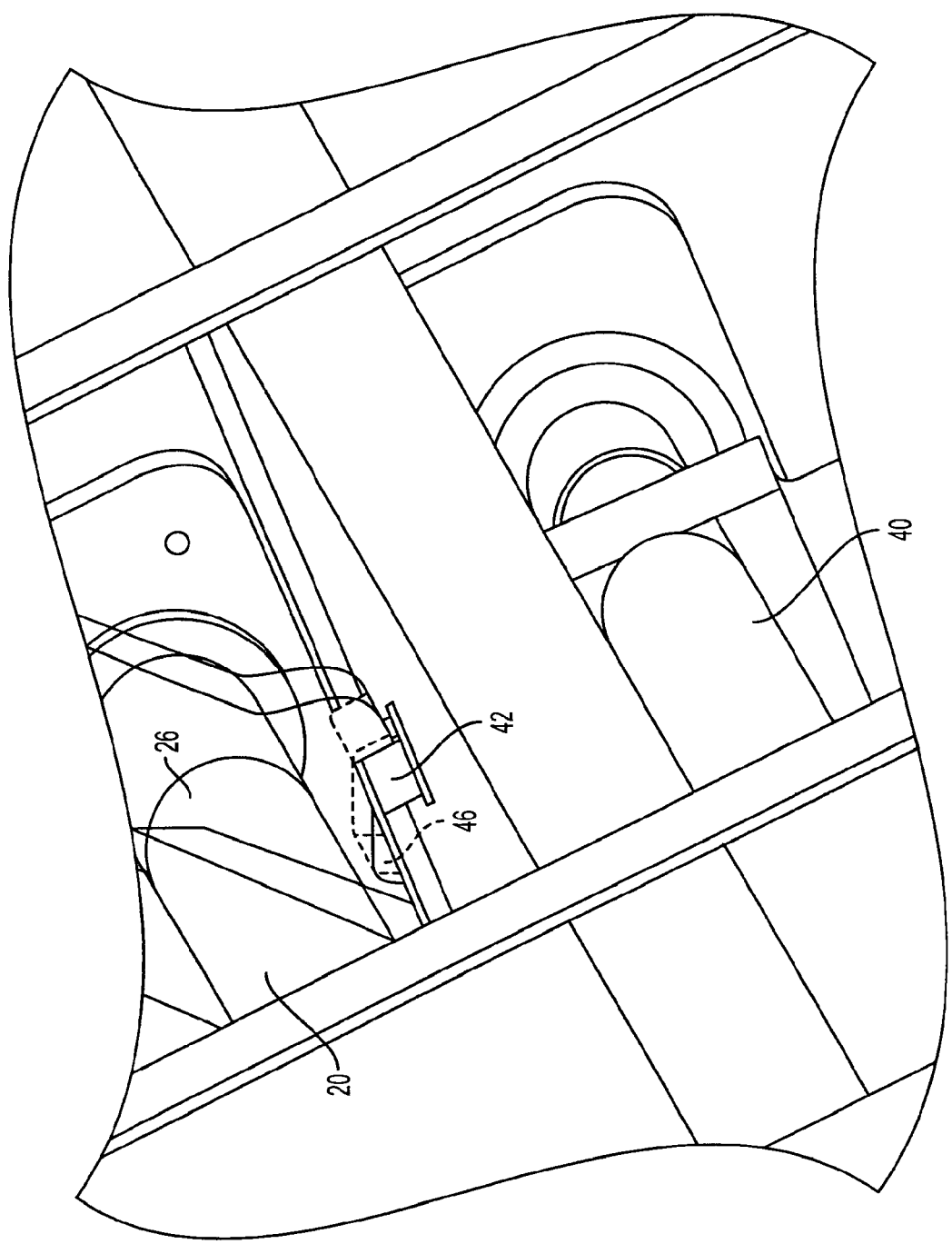
FIG. 12B is an isometric view of a portion of the monitoring system of FIG. 12A, showing the vent door open and the pins in an extended position.
Figure 12C:
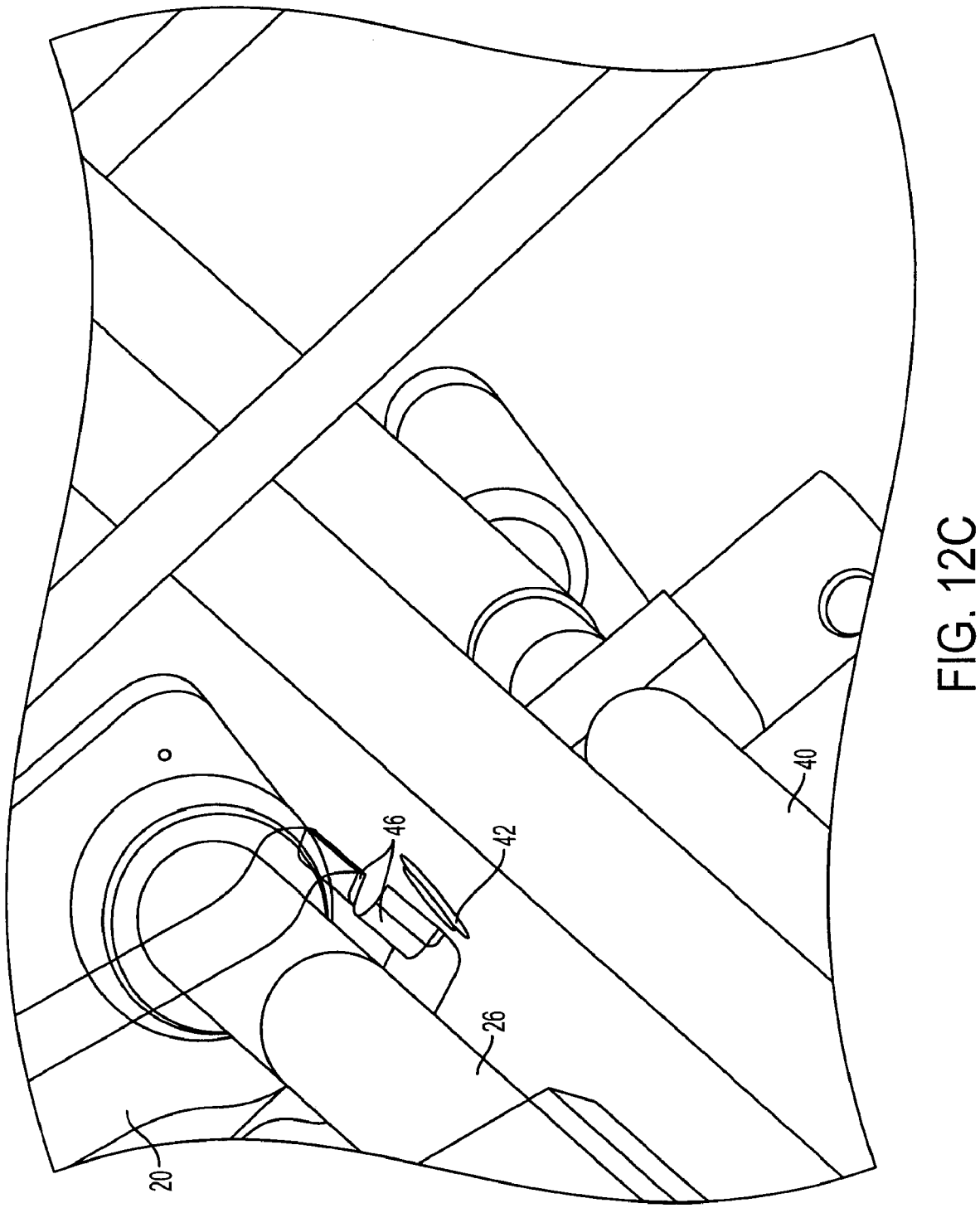
FIG. 12C is an isometric view of a portion of the monitoring system of FIG. 12A, showing the vent door closed and the pins in a retracted position.
Figure 13:
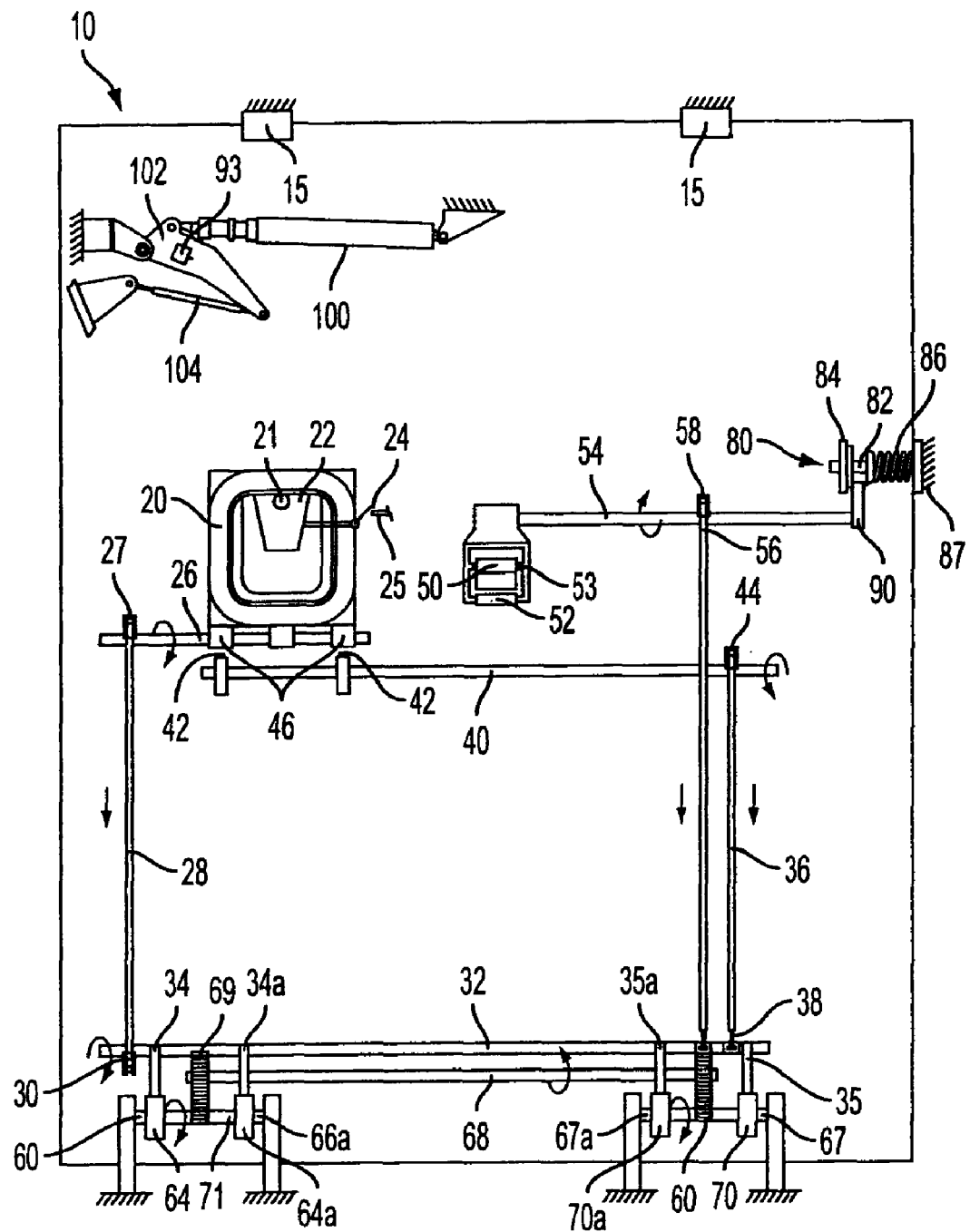
FIG. 13 is a schematic view of the components of an embodiment of the present invention, with the door structure omitted.

FIG. 1 shows a view of the door 10 from the inside of the aircraft. FIG. 13 shows a schematic view of the components of the door 10. Door 10 is attached to the aircraft structure by hinges 15. Visible in these figures are the major systems of the door 10, including an actuating system comprising gas springs 100, an uplock release mechanism 93, and crank arms 102; a locking system, comprising a vent door 20 and a locking mechanism including locking tabs 34, 34a, 35, and 35a; and a monitoring system including monitoring shaft 40, pins 42, and stops 46 (as shown in FIGS. 12A, 12B, and 12C) that prevents an operator from placing the locking system in a locked position in case of a malfunction in the system. Also visible is the latching system, including an exterior main latch handle 52 (see FIGS. 5A and 5B) that controls a mechanism including latch cams 64, 64a, 70, and 70a that engage latch pins 66, 66a, 67, and 67a respectively (see FIGS. 2, 3A, 3B, 7A, and 7B), and an interlock 80 (see FIGS. 8A and 8B) that prevents the main latch handle from being operated until the door 10 is in place to be latched. FIGS. 11A, 11B, and 11C show the range of motion of door 10.

Figure 4:
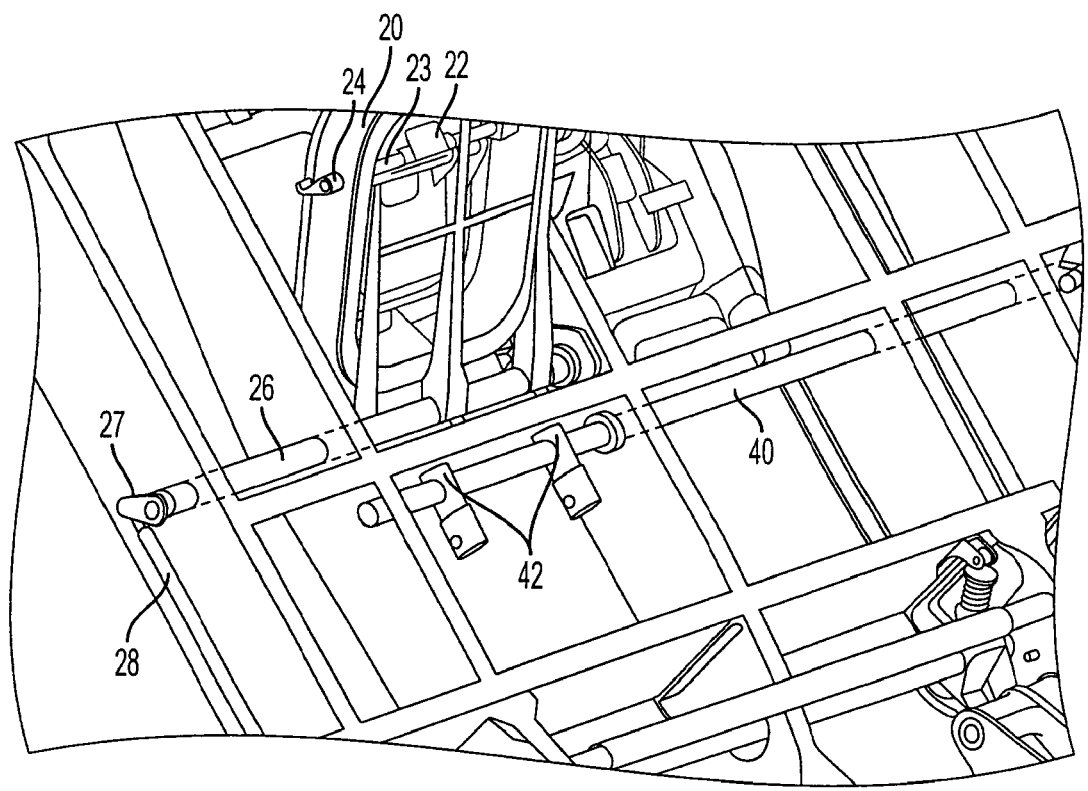
FIG. 4 is an isometric detailed view of the monitoring system of the door of FIG. 1, showing the pins extended and the vent door open.
Figure 5A:
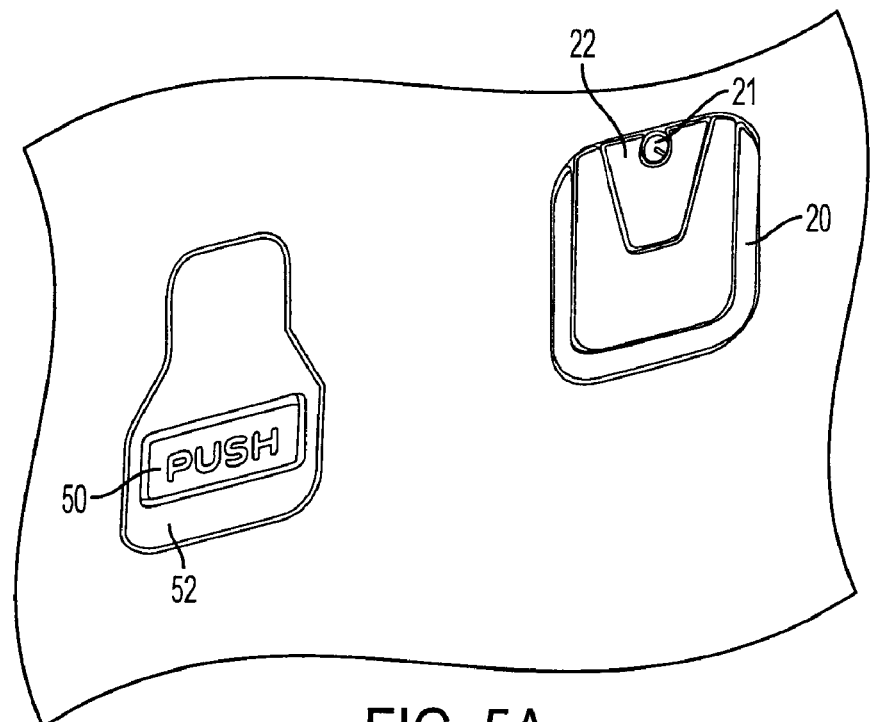
FIG. 5A is an isometric detailed view of the exterior of the door of FIG. 1, showing the vent door in the closed position and main latch handle in the latched position.
Figure 5B:
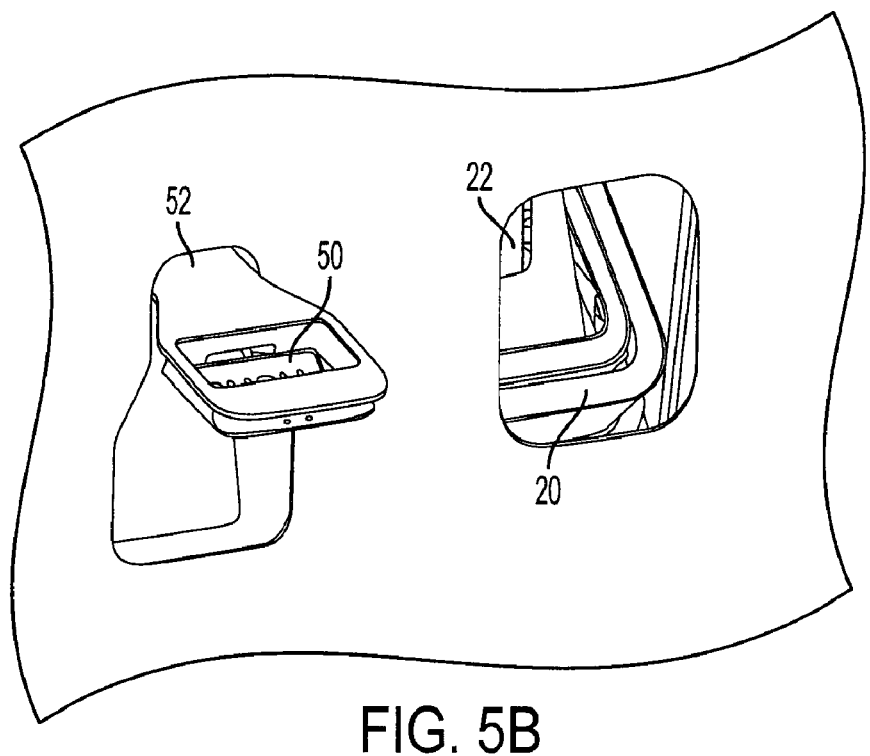
FIG. 5B is view of the components of FIG. 5A, showing the vent door open and latch handle unlatched.
Figure 5C:
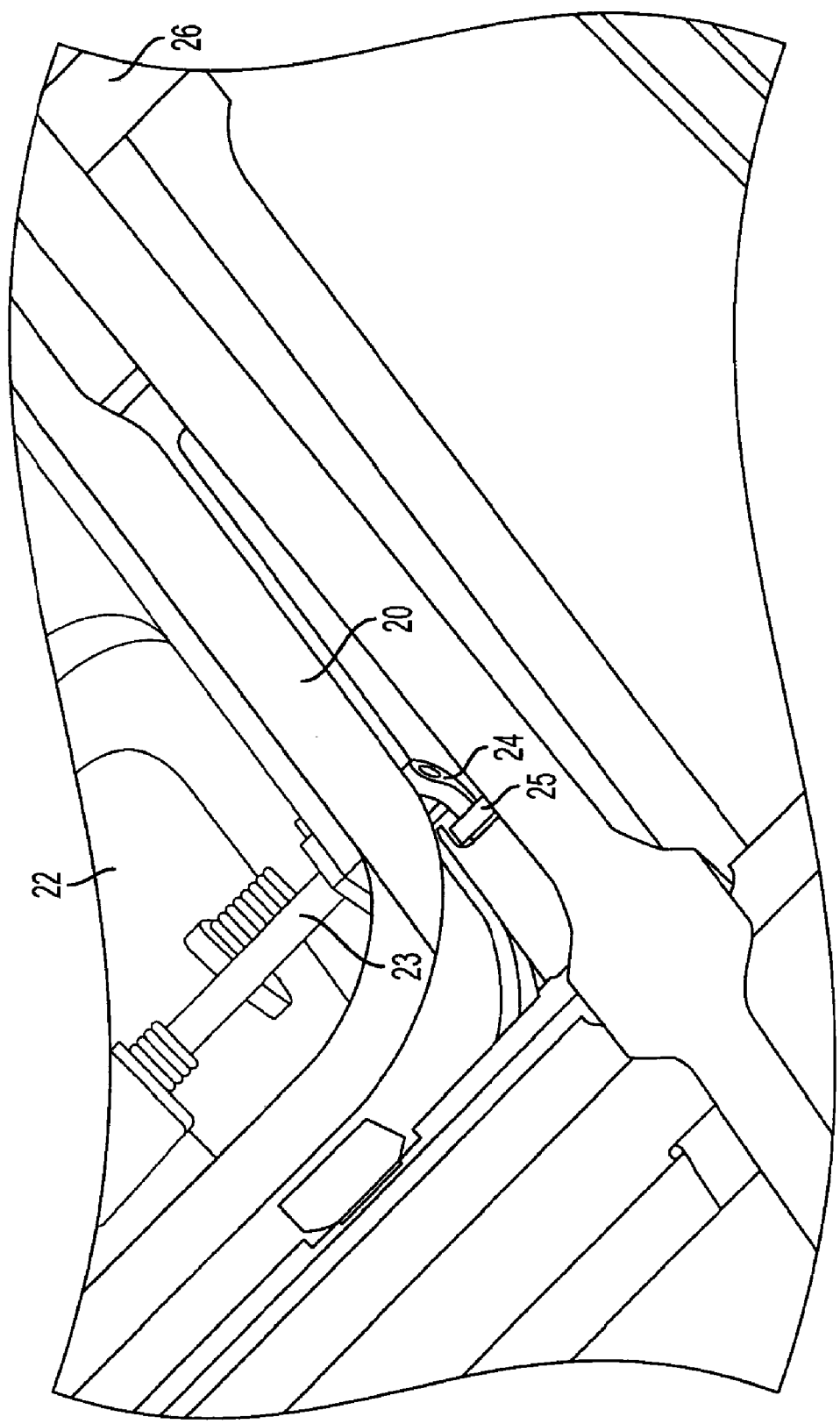
FIG. 5C is an isometric detailed view of the rear of the vent door, showing a hook securing the vent door in a closed position.

Referring now to FIGS. 5A and 5B, when a user desires to open the door 10, the user first unlocks vent door 20 by use of key lock 21. This releases ditching button 22, the movement of which turns rod 23, which in turn releases at least one hook 24 from tab 25, thus releasing the vent door 20, as shown in FIGS. 4 and 5C. Once the vent door 20 is released, it may be pushed open, as shown in FIGS. 4 and 5B. Referring now back to FIG. 1, the vent door 20 is coupled to torque tube 26. As shown in FIG. 13, when the vent door 20 is pushed open, the movement turns torque tube 26, which is movably attached to tie rod 28 via bell crank 27, as seen in FIG. 4. As shown in FIGS. 1, 3A, 3B, and 13, tie rod 28 is further movably coupled to bell crank 30, which is coupled to one end of, and drives, locking shaft 32. Also attached to the locking shaft 32 is at least one locking tab 34. As the motion of the vent door 20 is translated to bell crank 30, locking tab 34 moves away from primary latch cam 64, providing clearance for the latch cam 64 to rotate when actuated by the latching system. In a preferred embodiment, there are four locking tabs 34, 35, 34a, and 35a rigidly attached to the locking shaft 32, corresponding to each of two primary latch cams 64 and 70 and two secondary latch cams 64a and 70a. In normal operation, the two primary latch cams 64 and 70 are preferably loaded, while the two secondary latch cams 64a and 70a are preferably unloaded. As seen in FIG. 1, the locking tabs preferably include primary tabs 34 and 35, corresponding to primary latch cams 64 and 70 respectively, and secondary tabs 34a and 35a, corresponding to secondary cams 64a and 70a respectively.

Figure 2:
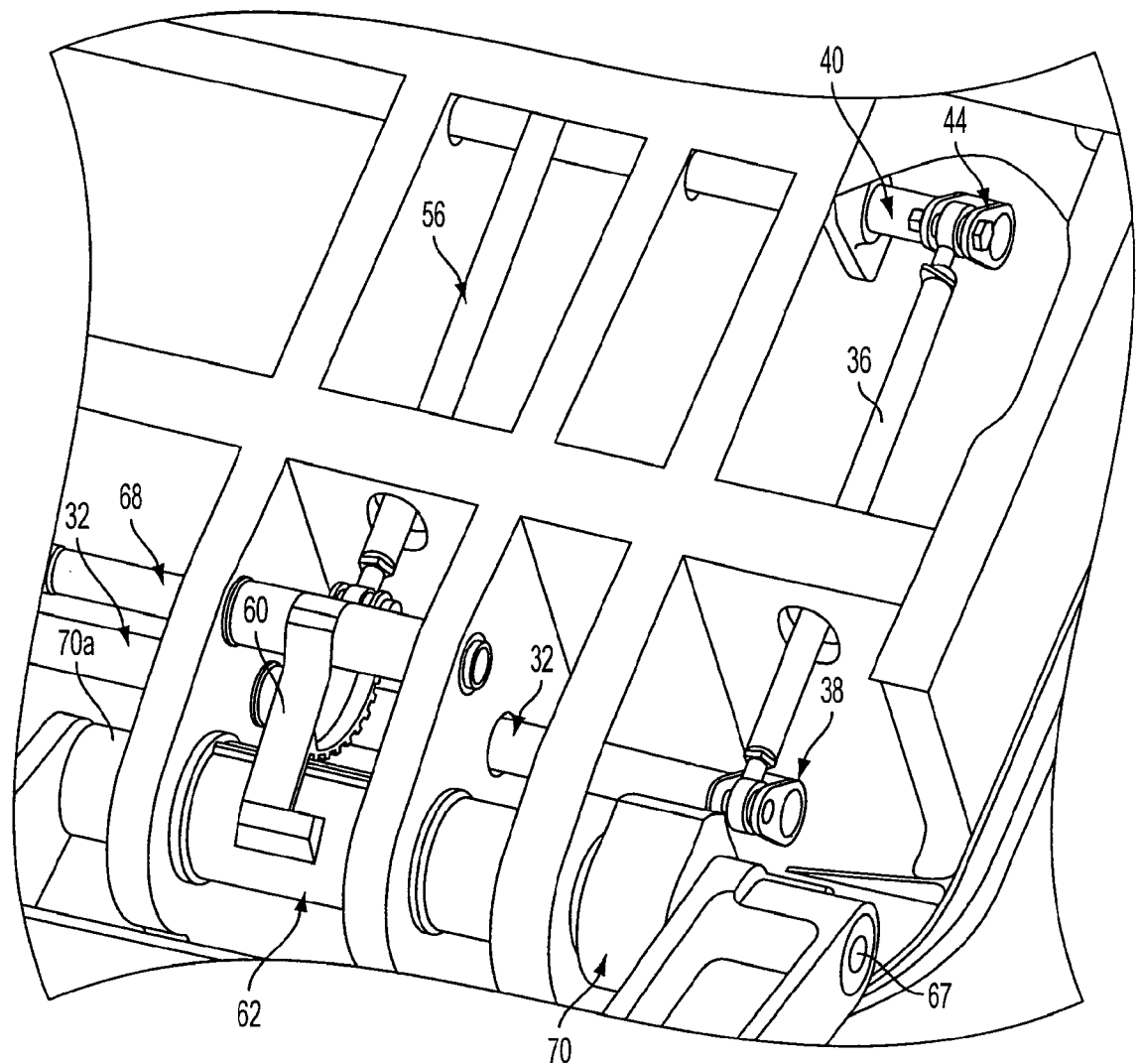
FIG. 2 is an isometric view of a portion of the locking and latching systems of the door of FIG. 1, showing the locking system in the unlocked position and the latching system in the latched position.
Figure 3A:
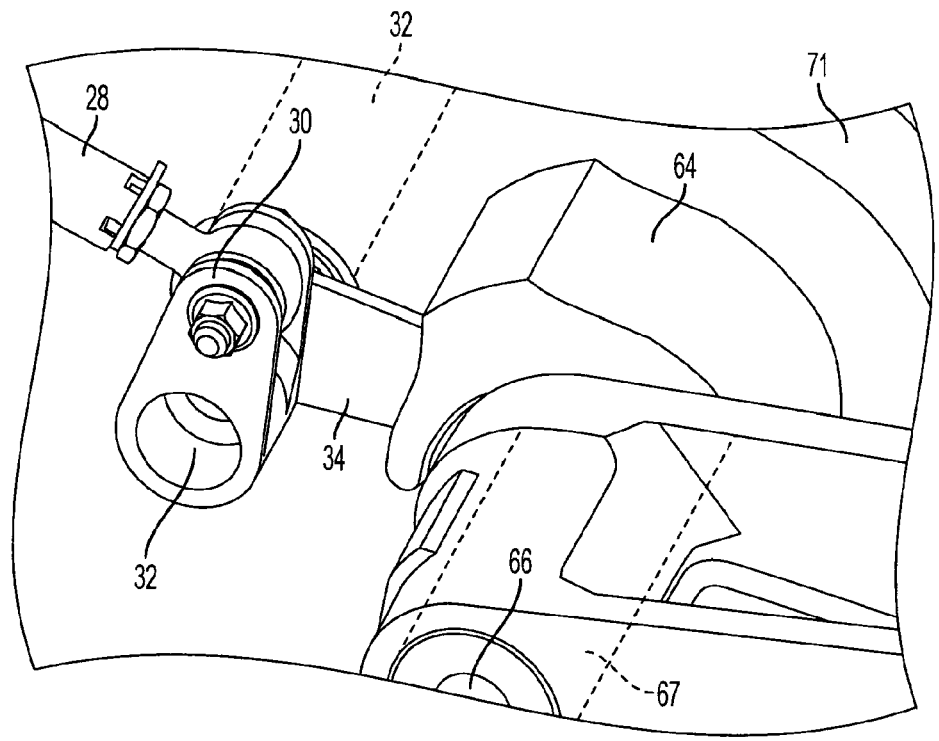
FIG. 3A is an isometric detailed view of components of the locking and latching systems of the door of FIG. 1, with the locking tab in the locked position.
Figure 3B:
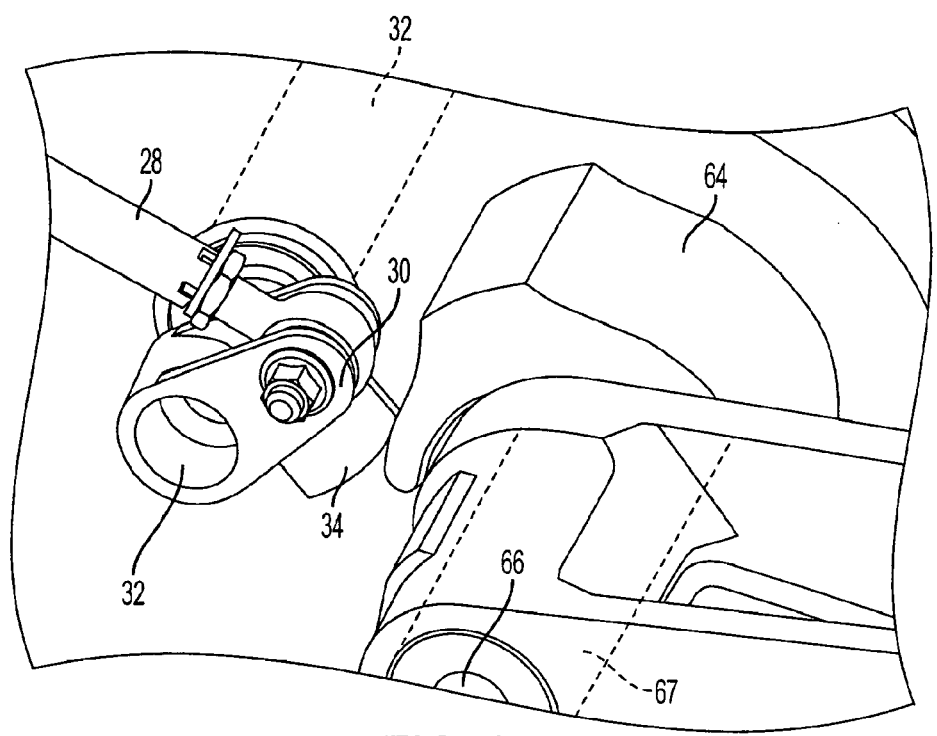
FIG. 3B is an isometric view of components of the locking and latching systems of the door of FIG. 1, with the locking tab in the unlocked position.

As shown in FIGS. 2 and 13, tie rod 36 is movably coupled to bell crank 38, which is rigidly attached to the end of the locking shaft 32 opposite to the end connected to bell crank 30, and connects the locking shaft 32 to a monitoring system. The monitoring system is operated by rigid components, including torque tube 40, tie rod 36, and pins 42, and thus does not share the susceptibility to icing that plagues current cable-operated monitoring systems. The monitoring system serves to prevent closure of the vent door 20 if there is a failure or malfunction somewhere in the locking system. That is, if the locking tabs 34, 34a, 35, and 35a fail to move into their proper locked positions, the monitoring shaft 40 will not rotate properly to retract the pins 42 from the recesses 46 in the vent door 20. Hence, the vent door 20 will be unable to close. While the vent door 20 is open, the aircraft may not be pressurized for flight. The pins 42 of the monitoring system serve to lock the vent door 20 in an open position, as shown in FIGS. 4 and 12B. As shown in FIGS. 1, 12A, and 13, the pins 42 are actuated through the motion of the locking shaft 32, which is movably connected to tie rod 36 via bell crank 38, and tie rod 38 is in turn is connected to monitoring shaft 40 via bell crank 44. The monitoring shaft actuates the pins 42, as shown in FIGS. 4, 12B, and 12C through a geared connection, although other means of actuation, such as bell cranks, or hydraulic or electromechanical means, can be used. If the locking system is operational (i.e., each locking tab 34, 34a, 35, and 35a moves into engagement with its associated latching cam 64, 64a, 70, and 70a, respectively) when a user attempts to lock the door 10, the monitoring shaft 40 will rotate to retract the pins 42 as shown in FIG. 12C, thus allowing the vent door 20 to be closed. As shown in FIG. 12B, when the vent door 20 is open, the pins 42 are extended and, in combination with recesses 46, serve as stops to limit the opening motion of the vent door 20, while also serving to prevent the closure of the vent door if there is a disconnection somewhere in the locking system. Thus, while the pins 42 are extended, the motion of the vent door 20 is limited by the pins and recesses 46 in the vent door 20; the pins 42 and recesses 46 thus also serve to limit the opening motion of the vent door 20. The monitoring system ensures that the locking tabs 34, 34a, 35, and 35a are in proper position because each component of the monitoring system is coupled to the locking system via rigid members, such as shafts 32 and 40, and tie rod 36. Because the rigid members are able to transmit forces in both tension and compression, any failure of a part to move will prevent the entire system from moving. Movement of the monitoring shaft 40, and retraction of the pins 42, depends on successful engagement of the locking tabs 34, 34a, 35, and 35a with latch cams 64, 64a, 70, and 70a, respectively. Specifically, because the movement of closing the vent door 20 rotates shaft 26, and that rotation is translated via tie rod 28, locking shaft 32, and tie rod 36 to rotate monitoring shaft 40 to retract pins 42, if any of these components fail, or the locking tabs 34, 34a, 35, and 35a are prevented from moving into position, the pins 42 will not retract and vent door 20 will not be able to fully close. As would be understood by one having ordinary skill in the art, the size and geometry of the recesses 46 in relation to the diameter of pins 42 allow for sufficient motion of the vent door 20 to enable the components of the system (shaft 26, tie rod 28 etc.) to move without binding. Thus, successful retraction of the pins 42 indicates that every part of the locking system, including locking tabs 34, 34a, 35, and 35a, is positioned properly. While the pins 42 may be actuated by any number of means, including but not limited to electronic means, it is preferred that the pins are actuated mechanically by the motion of the locking shaft acting on the monitoring shaft through a rigid member.

Figure 6A:
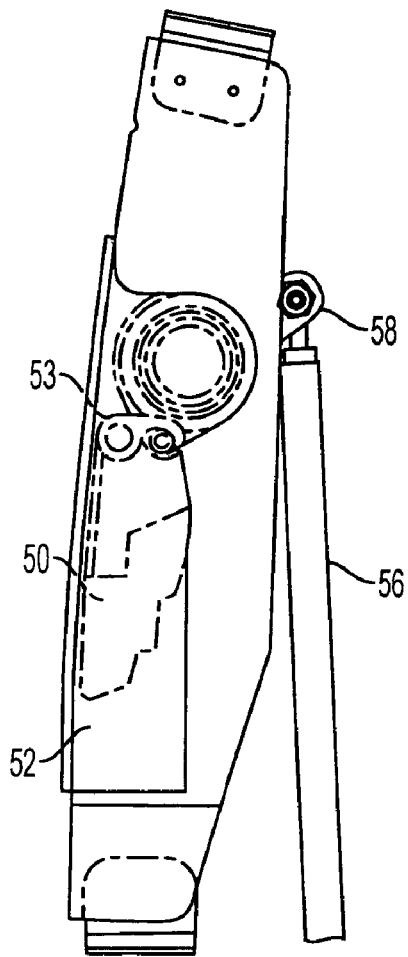
FIG. 6A is a side view of the main latch handle of FIGS. 5A and 5B, showing the independent latch lock system of the present invention in the locked position.
Figure 6B:
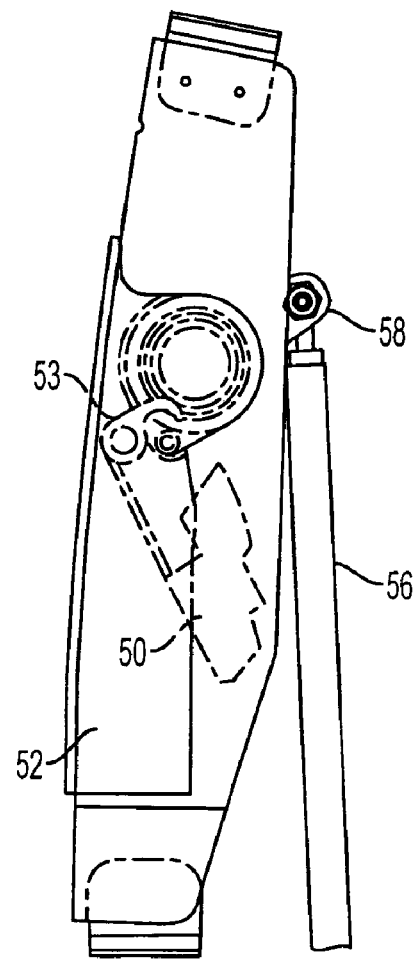
FIG. 6B is a side view of the main latch handle of FIGS. 5A and 5B, showing the access panel pushed in and the latch lock in the unlocked position and the latch handle in the latched position.
Figure 7A:
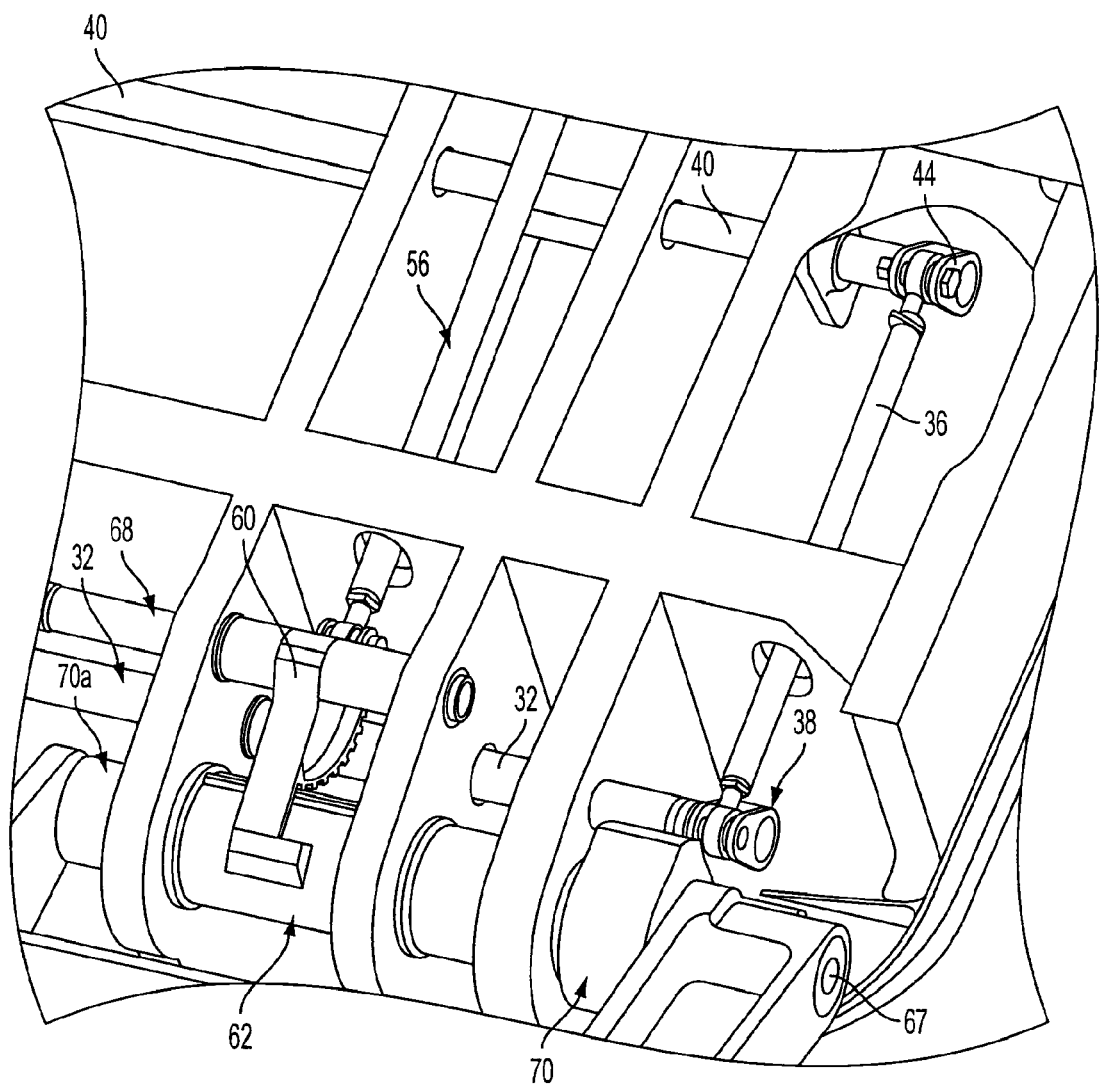
FIG. 7A is an isometric close up view of components of the latching system in the latched position.
Figure 7B:
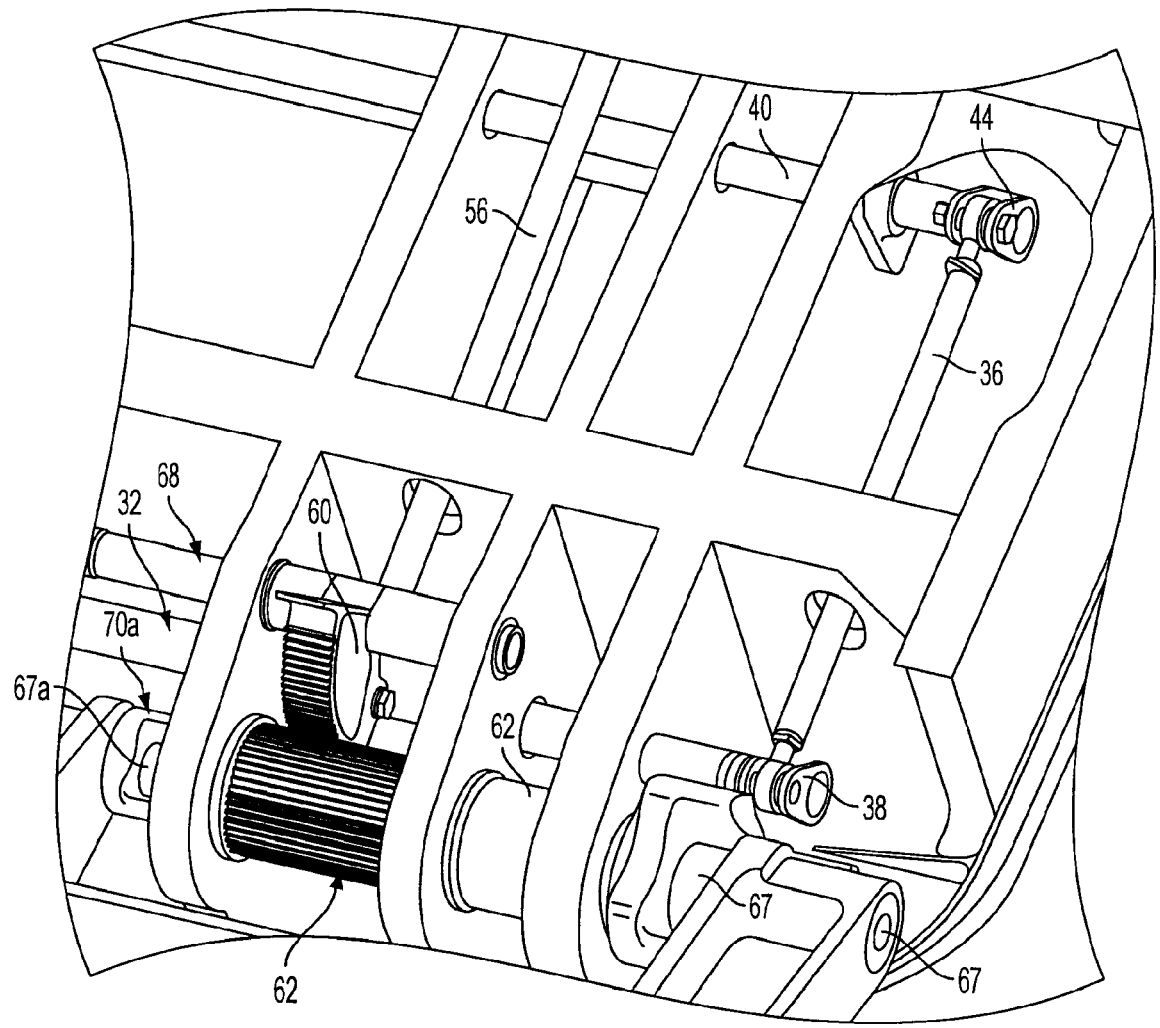
FIG. 7B is a view of the components of FIG. 7A, showing the components in the unlatched position.

After the door 10 is unlocked, the operator would proceed to unlatch the door 10. First, access flap 50 is pushed in to gain access to main latch handle 52, as shown in FIGS. 5A, 5B, 6A, and 6B. Pushing in the access flap unlocks the latch handle by releasing at least one hook or catch 53 inside the mechanism, as shown in FIG. 6B. The catch 53 prevents ground loading and flight forces from activating the latch system. Because the main latch handle 52 is normally locked and flush with the exterior surface of the door 10, no torque can act on the latch handle 52 until it is unlocked. Next, the latch handle is lifted upwards and away from the door 10, as shown in FIG. 5B. The handle is mechanically linked to the latching system, as shown in FIGS. 1, 6A, 6B, and 13. In an embodiment, the main latch handle is rigidly connected to main handle shaft 54, which itself is coupled to tie rod 56 by bell crank 58. As shown in FIG. 13, rotation of the main handle shaft 54 actuates tie rod 56, which is coupled to sector gear 60. As shown in FIGS. 7A and 7B, as the main handle shaft 54 rotates, tie rod 56 actuates sector gear 60. The sector gear engages cam shaft 62 via a geared connection. The cam shaft is rigidly coupled to at least one latch cam 70, which is disposed around a corresponding latch pin 67, itself rigidly mounted to the aircraft structure. As tie rod 56 moves the sector gear 60, the gear rotates the cam shaft 62, and the at least one latch cam 70 rotates and disengages from the corresponding latch pin 67, so that the door 10 may then be opened. As shown in FIGS. 1 and 13, cam shaft 62 may also be rigidly connected to a secondary latch cam 70a, which may be disposed around a secondary latch pin 67a. In a preferred embodiment, the door 10 includes two primary (normally loaded) latch cams 64 and 70, engaging primary pins 66 and 67, respectively, and two secondary (normally unloaded) latch cams 64a and 70a, engaging secondary pins 66a and 67a, respectively. As shown in FIG. 13, a primary and secondary cam/pin set is located on each of the forward and aft ends of the door, as shown in FIGS. 1, 11B, and 13. The cams preferably all move simultaneously with the motion of latch handle 52; in the embodiment shown in FIG. 13, sector gear 60 is rigidly connected to latch shaft 68, which may be rigidly connected to a second sector gear 69. Gear 69 engages and drives a corresponding set of latching components, including a second cam shaft 71, primary and secondary latch cams 64 and 64a, which engage primary and secondary latch pins 66 and 66a respectively, as shown in FIGS. 1 and 13.

Figure 8A:
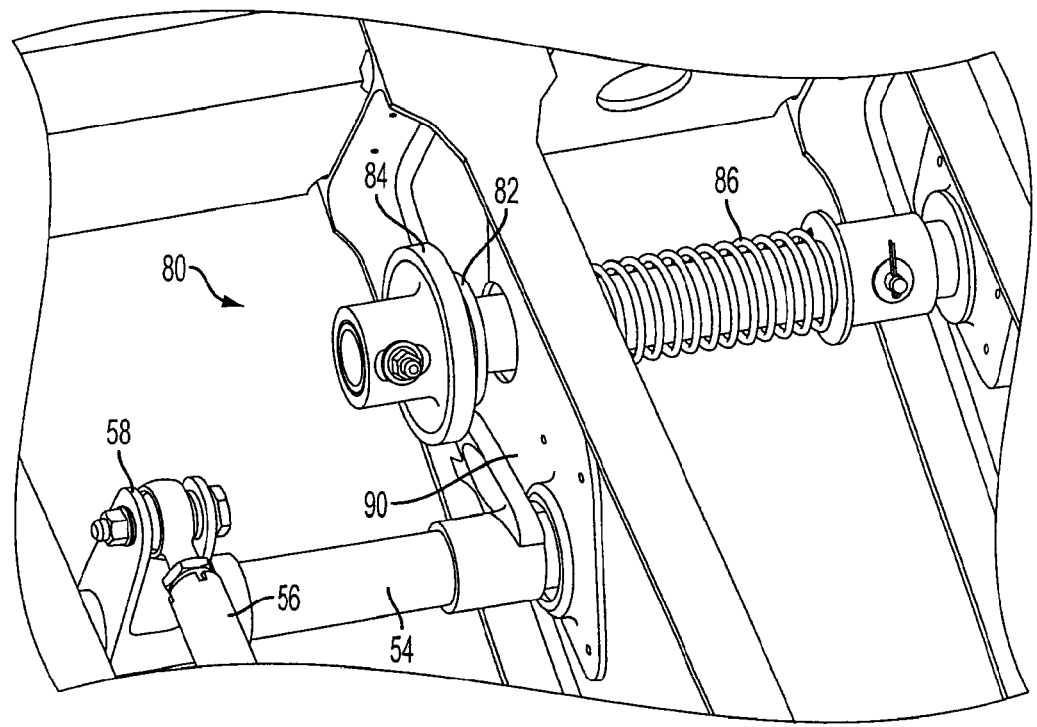
FIG. 8A is an isometric detailed view of the interlock system of the door of FIG. 1, showing the interlock in a first disengaged position.
Figure 8B:
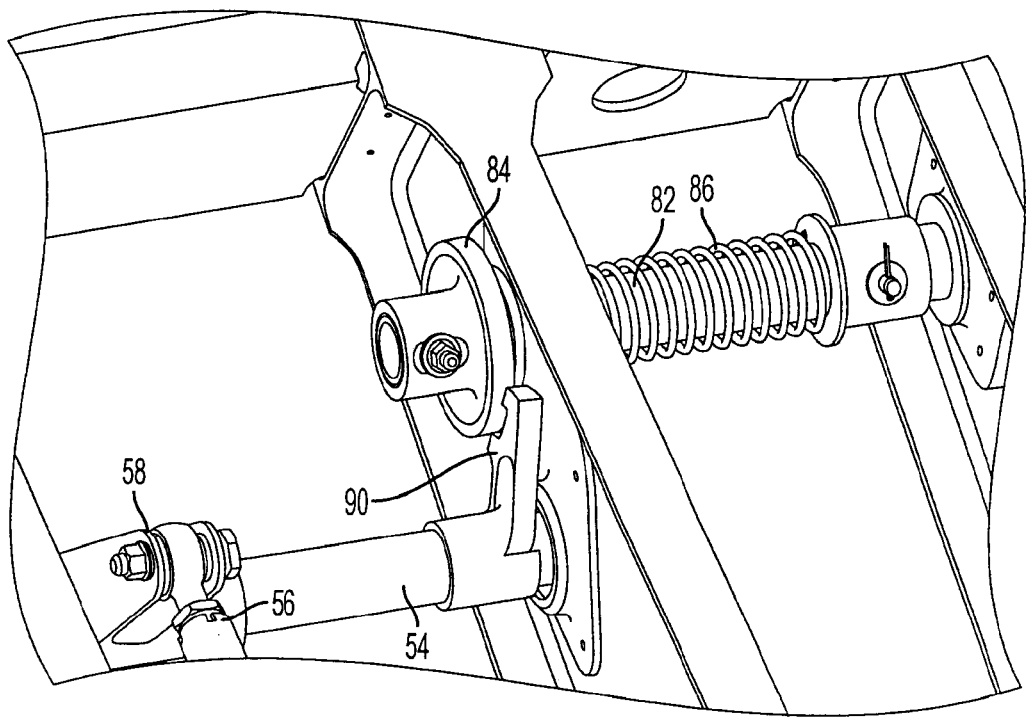
FIG. 8B is an isometric view of the interlock system of the door of FIG. 1, showing the interlock in a second engaged position.

Referring to FIGS. 8A, 8B, and 13, when the door 10 is opened, interlock 80 locks the main handle 52 in position, preventing actuation of the main handle 52 until the door 10 is in position to be latched. Referring now to the embodiment shown in FIG. 8A, the interlock 80 includes a plunger 82 integrally connected near a first end to a collar 84, with a second end of the plunger opposite the first end capable of protruding through the edge of the door 10, as shown in FIG. 11C. The plunger 82 is biased into an extended (i.e., protruding) position by spring 86. As shown in FIG. 13, when the door 10 is in a closed position, the plunger 82 is forced into a compressed position by its contact with a striker plate 87. Striker plate 87 is mounted on the edge of the door opening so as to contact the protruding end of the plunger 82 as the door 10 closes, as shown in FIGS. 11B and 11C. The striker plate 87 contacts the protruding end of the plunger 82 and forces it into a compressed position in which the collar 84 does not interfere with the movement of interlock arm 90, which is rigidly mounted on the handle shaft 54. Handle shaft 54 is rigidly connected to the main handle 52, so that when the main handle 52 is in a latched position, the interlock arm 90 is in a first position underneath collar 84, as shown in FIG. 8A. When the main handle 52 is pulled by a user (thus unlatching the door 10 as described above), handle shaft 54 rotates, causing interlock arm 90 to move into a second position away from collar 84, as shown in FIG. 8B. When the door 10 is pulled open, the plunger 82 moves out of contact with striker plate 87, and the force stored in the spring 86 moves the plunger 82 into an extended position, moving the collar 84 into the space formerly occupied by the interlock arm 90. The movement of the collar 84 as the door 10 opens prevents interlock arm 90 from moving back into that space until the door is closed and plunger 82 is depressed. Because the interlock arm 90 is rigidly mounted on handle shaft 54, collar 84 prevents rotation of the handle shaft 54, and thus, placement of the main handle 52 back into a latched position. The operation of the interlock prevents the latch system from being placed into the latched position unless the door 10 is in position to be latched.

Figure 9A:
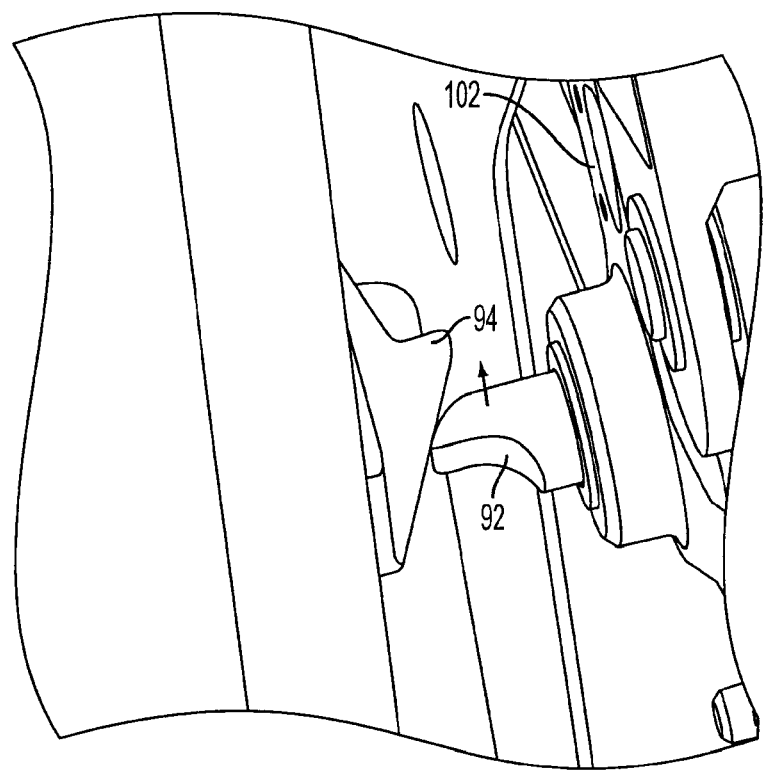
FIG. 9A is an isometric detailed view of the uplock system of the door of FIG. 1, showing the uplock disengaged.
Figure 9B:
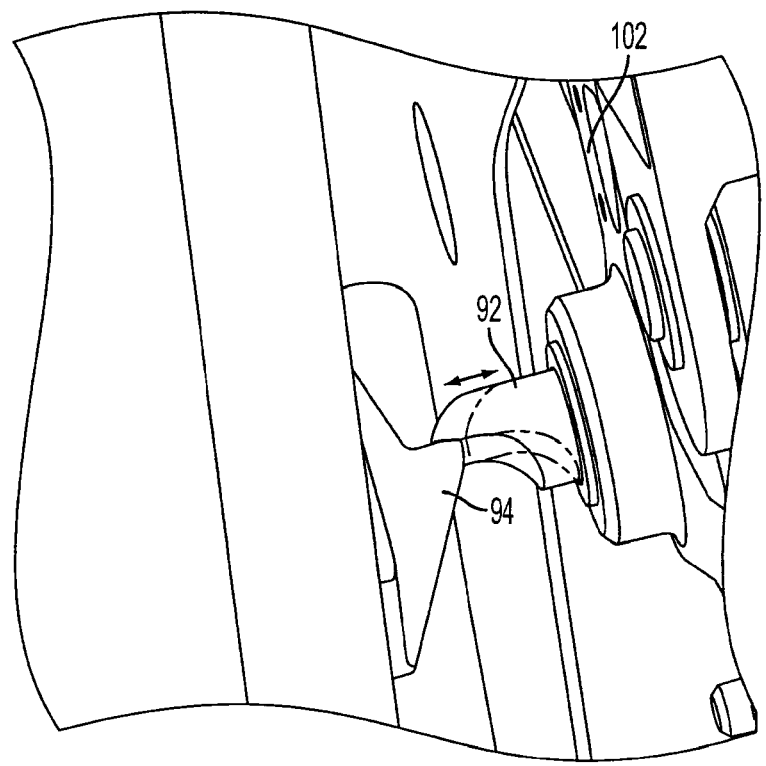
FIG. 9B is an isometric view of the uplock system of the door of FIG. 1, showing the uplock in its normal engaged position when the door is fully open, and showing a second disengaged position in phantom view.

When the door 10 is fully open, it is locked in the open position by an uplock mechanism, as shown in FIGS. 9A, 9B, 9C, and 11C. Uplock 92 extends through a crank arm 102, as shown in FIGS. 9A and 9B. As the door is placed into a fully open position (as shown in FIG. 11C), uplock 92 scrubs against fitting 94, as shown in FIG. 9A. Fitting 94 is rigidly mounted to the aircraft structure, as seen in FIGS. 11B and 11C. As shown in FIG. 9A, when the door 10 is fully open, the uplock 92 rests on the top edge of the fitting and prevents the door from being lowered until the uplock 92 is released from the fitting 94. The uplock 92 may be spring-loaded so that it rests in an extended state and is pushed or pulled into a retracted state either by contact with the fitting 94 as the door is opened, or by a release mechanism 93 when an operator desires to close the door, shown in FIGS. 9C, 10A-10C, and 11A-11C. In this example, the release mechanism 93 is cable-operated, although the uplock 92 may be released through a number of means, including solenoid or other electronic activation.

Figure 10A:
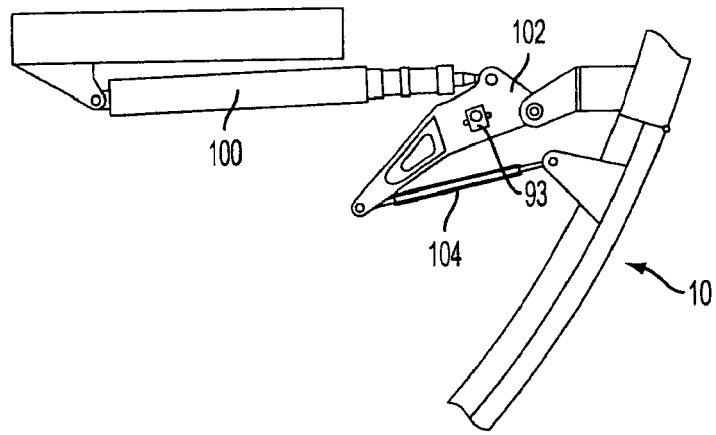
FIG. 10A is a side view of the door of FIG. 1 in the closed position.
Figure 10B:
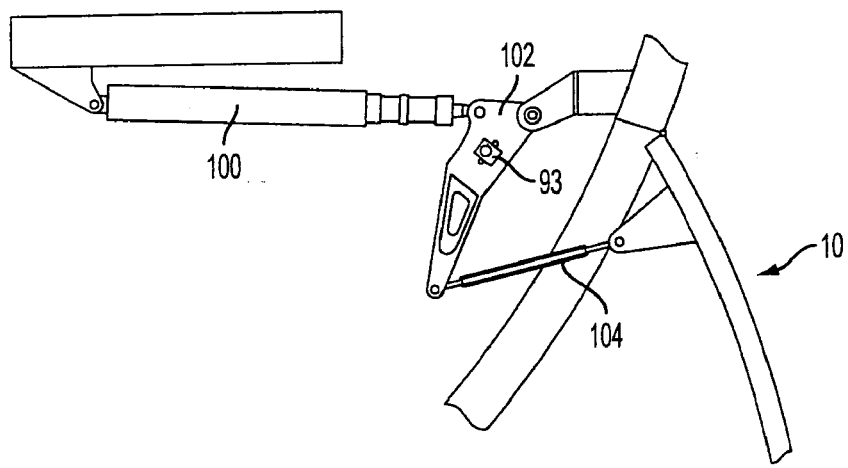
FIG. 10B is a side view of the door of FIG. 1 in a partially-open position.
Figure 10C:
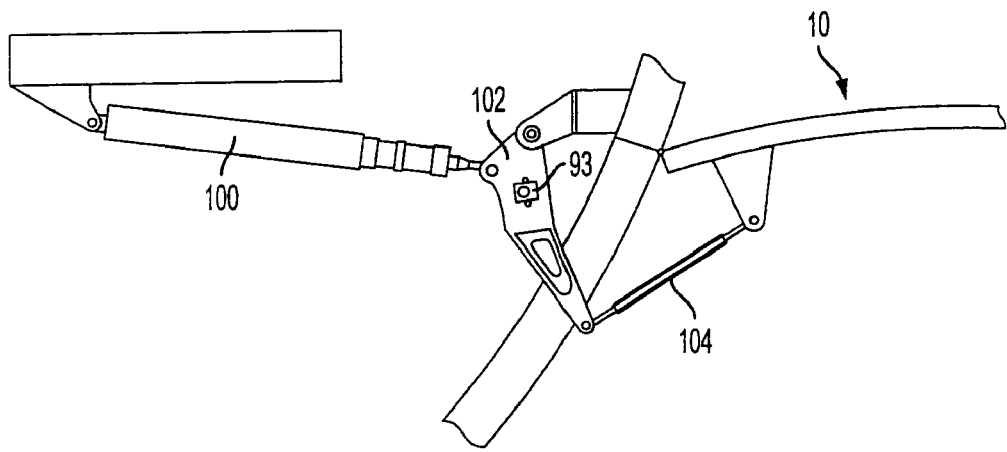
FIG. 10C is a side view of the door of FIG. 1 in a fully open position.

Referring now to FIGS. 10A, 10B, and 10C, the actuating system includes a gas spring 100, a crank arm 102, and a pushrod 104. It is preferable that the actuating system include two matching sets of actuating components, although any number may be used. It is also preferable that gas spring 100 is used to generate a force to assist in opening and closing the door 10, although one of ordinary skill will perceive that the force may be generated in a number of ways, including coil springs. In an embodiment, the gas spring 100 applies a force through a pivoting connection to the crank arm 102, which is connected at a second pivot point to the structure of the aircraft. The crank arm in turn transmits that force through a pivoting connection, located at a third point, to the pushrod 104, which is itself pivotally connected to a mounting point on the door 10.

As seen in FIGS. 1, 10A, 10B, and 10C, while the second pivot point of the crank arm 102 is aligned with the axis of rotation of door 10 about hinges 15, the other pivot points of the crank arm 102 occupy an off-center position relative to that axis; this allows the actuating system to oppose the force of gravity no matter what the door 10's position. When the door is in a closed or partially-closed position, as shown in FIG. 10A, the misalignment of the point at which the spring 100 applies force to the crank arm 102 and the second pivot point of crank arm 102 creates a moment arm, and therefore, a torque about the pivot point at hinge 15. This torque assists in biasing the door towards a closed position (i.e., away from vertical). As the door reaches a roughly vertical position, as shown in FIG. 10B, the distance between the force application point and the pivot point reaches zero (i.e., the direction of the force generated by the spring projects lines up with the pivot point), the moment arm length reaches zero, and no torque is applied to the door 10 by the spring 100. As shown in FIG. 10C, as the door 10 moves away from vertical into an open position, the moment arm is again present, creating a torque in a direction opposite that applied when the door 10 was in the orientation shown in FIG. 10A. This torque assists in biasing the door into a more open position (i.e., away from vertical). The changing alignment of the force application and pivot points is beneficial because aircraft cargo doors are typically not oriented vertically when in a closed position; an aircraft door must typically be pushed up to close against the underside of the aircraft fuselage. Therefore, it is beneficial to have an actuating system that helps oppose the force of gravity during both opening and closing. While the embodiment described makes opening and closing of the door easier and helps avoid operator injury and fatigue, the actuating system may alternatively assist in only one direction.

Figure 9C:
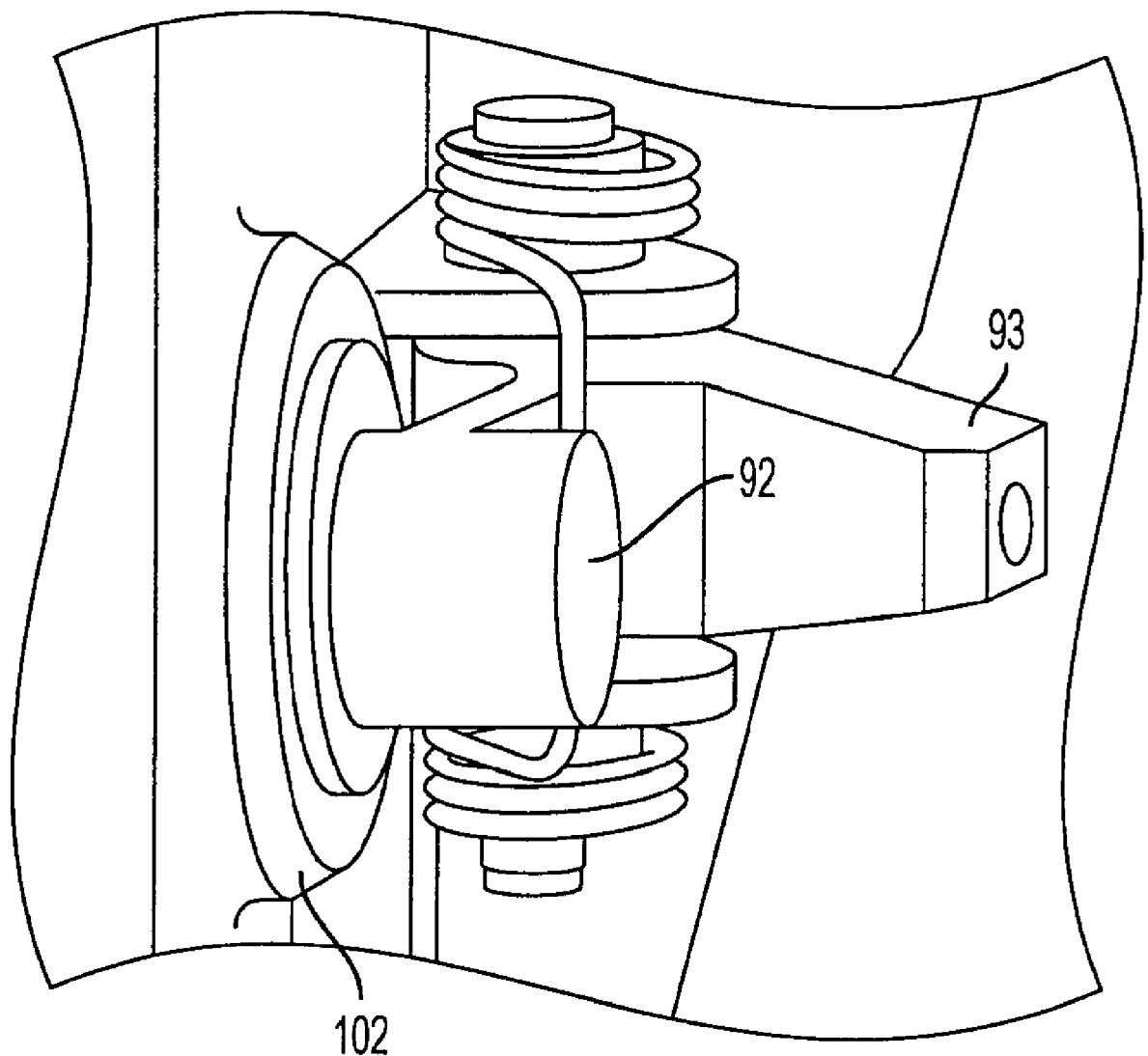
FIG. 9C is an isometric view of the release mechanism for the uplock.

When an operator desires to close the door, the steps are performed in reverse order. First, the operator releases the uplock 92 by means of release mechanism 93, as shown in FIGS. 9A-9C. The release mechanism 93 is preferably cable-actuated, but may be operated by hand or by any number of mechanical or electrical systems, such as hydraulics or solenoids. As the door is lowered, the gas springs 100 act on the cranks arms 102 and pushrods 104 in the manner described above, opposing the force of gravity throughout the door's range of motion. As the door 10 approaches the closed position-shown in FIGS. 10A and 11A—the interlock plunger 82 contacts the striker plate 87 and is pushed from its extended position into a compressed position. As shown in FIG. 8A, this moves collar 84 out of the path of motion of interlock arm 90. Once the door 10 is in the closed position, the operator closes main latch handle 52 by moving it back into a latched position substantially flush with the exterior surface of the door 10, as shown in FIG. 5A. As the handle 52 moves, the main handle shaft 54 rotates, moving interlock arm 90 into position under the collar 84, as shown in FIG. 8B. Also as the shaft 54 rotates, crank arm 58 actuates tie rod 56, which is coupled to sector gear 60, as shown in FIGS. 7A, 7B, and 13. The motion of tie rod 56 rotates gear 60, turning cam shaft 62 and moving latching cams 70 and 70a from the unlatched position shown in FIG. 7B to the latched position, engaged with latch pins 67 and 67a, respectively, as shown in FIG. 7A. It is preferred that gear 60 is coupled to gear shaft 68, which in turn drives a second sector gear 69, itself engaged with cam shaft 71. Cam shaft 71 operates latch cams 64 and 64a, which engage latch pins 66 and 66a, respectively, in the manner described above. Once the main handle 52 is in the latched position, access flap 50 returns to its original latched position substantially flush with the exterior surface of the door 10, as shown in FIG. 6A. With the flap 50 in latched position, catch 53 is engaged, preventing movement of the main handle 52.

Once the door 10 is latched, the operator locks it by closing the vent door 20. As the vent door 20 is moved into a closed position substantially flush with the exterior surface of the door 10 (as shown in FIG. 5A), shaft 26 rotates, actuating tie rod 28 through crank 27, as shown in FIGS. 4 and 13. The motion of tie rod 28 turns locking shaft 32, which is coupled to locking tabs 34, 34a, 35, and 35a, which are associated with latching cams 64, 64a, 70, and 70a, respectively as described above. As the vent door 20 moves into the closed position, the locking tabs move from an unlocked position shown in FIG. 3B into a locked position as shown in 3A in which each tab prevents movement of the associated latching cam. When the tabs 34, 34a, 35, and 35a are in locked position, the latching cams 64, 64a, 70, and 70a cannot disengage from the latching pins 66, 66a, 67, and 67a.

As described above, locking shaft 32 is coupled to tie rod 36 by crank 38. As shown in FIGS. 7A, 12A, and 13, as the locking shaft 32 rotates, tie rod 36 translates the motion to monitoring shaft 40 through crank 44; therefore, monitoring shaft 40 only rotates when locking shaft 32 does so. As shown in FIGS. 12A, 12C, and 13, the motion of the monitoring shaft 40 retracts the pins 42 from recesses 46, and allowing the vent door 20 to fully close. As noted above, the geometry of the recesses 46 and the pins 42 should be such that the system may move without binding. If any of the locking tabs fails to move into a locked position, or if there is a disconnection between any of the vent door 20, locking shaft 32, or monitoring shaft 40, the pins 42 will not retract and will contact the sides of the recesses 46, and the vent door 20 will be unable to close, as shown in FIG. 12B. Without the vent door closed, the aircraft cannot be pressurized for flight. In this way, the monitoring system ensures that the door is locked before the aircraft can be readied for flight. As described above, because the locking and monitoring systems are actuated by rigid components, they are not susceptible to failure due to icing. Once the vent door 20 is closed, the operator releases the ditching button 22, which engages the catch 24 on tab 25, preventing motion of the vent door, as shown in FIG. 5C. The operator may then lock the vent door using key lock 21, shown in FIG. 5A.

It will be apparent to those skilled in the art that various modifications and variations can be made in the configuration of the present invention without departing from the spirit or scope of the invention. It is intended that the present invention cover such modifications and variations provided they come within the scope of the appended claims or their equivalents.

What is claimed is:

1. A door for an aircraft, comprising:
   a latching system for latching the door in a closed position;
   an interlock system that prevents operation of the latching system unless the door is in proper position to be latched;
   a monitoring system that prevents a vent door in the door from moving to a closed position unless the latching system has latched the door in the closed position; and
   a locking system that includes the vent door and that selectably prevents operation of the latching system to unlatch the door.

2. The door of claim 1, wherein the latching system comprises:
   a handle;
   a first member movably coupled to the handle, wherein motion of the handle from the latched position to an unlatched position is translated by the first member to rotate a first gear;
   a cam shaft gearedly coupled to the first gear and coupled to at least one latching cam, wherein rotation of the gear by the first member causes rotation of the cam shaft and the latching cam; and
   wherein the latching cam is selectably engaged with a fixed latch pin so that when the handle is in the latched position, the latching cam is engaged with the latch pin to latch the door in the closed position, and when the handle is in the unlatched position, the cam disengages with the latch pin so as to allow the door to open.

3. The door of claim 2, wherein the cam shaft is rigidly coupled to at least a second latching cam, and the cam shaft operates the first and second latching cams simultaneously to such that each of said first and second latching cams selectably engage with a respective said latch pin.

4. The door of claim 1, wherein the locking system comprises:
first and second rigid members, the first rigid member operating to transfer motion of the vent door to the second rigid member; and
a locking shaft, coupled to the second rigid member and to at least one locking tab, the tab being located proximate a corresponding latching cam so that when the vent door is in the closed position, the tab is in a locked position so as to prevent the corresponding latching cam from moving, and motion of the vent door from the closed position to an open position moves the at least one locking tab to an unlocked position in which the tab avoids interference with movement of the corresponding latching cam.

5. The door of claim 1, wherein the monitoring system comprises:
at least one rigid member coupled to the locking system so that motion of the vent door moves the at least one rigid member, such that movement of the at least one rigid member controls movement of at least one pin between an extended position that limits an amount of movement of the vent door to prevent closing of the vent door and a retracted position that avoids interference with closing of the vent door.

6. The door of claim 1, further comprising:
an actuating system that assists an operator with at least one of opening and closing of the door.

7. The door of claim 6, wherein the actuating system comprises:
at least one force applicator which is attached to the aircraft and applies a force to a crank arm that transfers force to the door when moving the door between the closed position and an open position.

8. The door of claim 7, wherein the force applicator includes a spring.

9. A door for an aircraft, comprising:
a latching system for latching the door in a closed position;
an interlock system that prevents operation of the latching system unless the door is in proper position to be latched; and
a monitoring system that prevents a vent door in the door from moving to a closed position unless the latching system has latched the door in the closed position;
wherein:
the latching system comprises:
a handle;
a first member movably coupled to the handle, wherein motion of the handle from the latched position to an unlatched position is translated by the first member to rotate a first gear; and
a cam shaft gearedly coupled to the first gear and coupled to at least one latching cam, wherein rotation of the gear by the first member causes rotation of the cam shaft and the latching cam; and
the latching cam is selectably engaged with a fixed latch pin so that when the handle is in the latched position, the latching cam is engaged with the latch pin to latch the door in the closed position, and when the handle is in the unlatched position, the cam disengages with the latch pin so as to allow the door to open; and
the first gear is coupled by a gear shaft to a second gear, the second gear being gearedly coupled to a second cam shaft, the second cam shaft being coupled to at least one other latching cam.

10. A door for an aircraft, comprising:
a latching system for latching the door in a closed position;
an interlock system that prevents operation of the latching system unless the door is in proper position to be latched; and
a monitoring system that prevents a vent door in the door from moving to a closed position unless the latching system has latched the door in the closed position;
wherein the interlock system comprises:
a striker plate mounted to a frame of the aircraft; and
a plunger extending from the door so as to contact the striker plate when the door is in a closed position, the plunger being biased to an extended position when the door is in an open position to impede motion of the latching system, and being moved into a retracted position by the striker plate when the door in the closed position to allow motion of the latching system.

11. A door system comprising:
the door of claim 1; and
an uplock system that secures the door in an open position.

12. The door system of claim 11, wherein the uplock system comprises:
a fitting mounted to the aircraft;
a retractable tab extending from the door and biased in an extended position to engage with the fitting to support the door when the door is in an open position.

13. A door for an aircraft, comprising:
a latching system for latching the door in a closed position;
an interlock system that prevents operation of the latching system unless the door is in proper position to be latched; and
a monitoring system that prevents a vent door in the door from moving to a closed position unless the latching system has latched the door in the closed position;
wherein the monitoring system comprises:
at least one rigid member coupled to the vent door such that movement of the at least one rigid member controls movement of at least one pin between an extended position that limits an amount of movement of the vent door to prevent closing of the vent door and a retracted position that avoids interference with closing of the vent door.

14. The door of claim 13, wherein:
movement of the vent door controls the movement of the at least one rigid member.

15. The door of claim 14, wherein the movement of the at least one rigid member is rotational in response to the movement of the vent door, and the rotational movement controls the movement of the at least one pin.

16. The door of claim 15, wherein the monitoring system further comprises:
a second rigid member that operates to translate movement of the vent door to cause the rotational movement of the at least one rigid member.

* * * * *